2,863,831
WELL DRILLING COMPOSITION AND METHOD

William E. Thompson, Wallingford, Pa., assignor to Sun Oil Company, Philadelphia, Pa., a corporation of New Jersey No Drawing. Application December 7, 1955
Serial No. 551,511

5 Claims. (Cl. 252—8.5)

This invention relates to the drilling of oil or gas wells by the rotary method. The invention more especially is directed to novel aqueous drilling fluids having particularly desirable characteristics for well drilling and to the regulation of the fluid characteristics during the course of drilling.

In the rotary drilling of wells drilling fluids conventionally employed when the conditions of use are not servere comprise an aqueous dispersion of a hydratable sodium base clay, such as bentonite of the Wyoming type. The clay imparts to the mud composition certain desired viscosity and gelation properties and helps to prevent loss of fluid to the formations drilled. Weighting materials, such as barytes, generally are added to the mud from time to time during the course of drilling to provide sufficient hydrostatic head to overcome formation pressures. As the clay solids content of the drilling fluid builds up during drilling, water may be added occasionally to thin out the mud or the mud may be treated with a suitable clay dispersant to avoid excessive increases in viscosity and gelation characteristics. For this purpose various phosphate, tannin or lignin compounds have been used.

As the drilling proceeds to deeper depths, conditions are often encountered which render the conventional sodium base drilling mud unsatisfactory for further use. This may be brought about by intrusion of salt water from formations drilled or by the drilling of calcareous materials such as limestone, gypsum, anhydrite and cement. Contamination of the drilling fluid by materials such as these tends to cause its viscosity and gelation characteristics to increase inordinately, with the result that sand and relatively small cuttings will not settle out properly in the mud pits and pumping of the mud may become difficult. In such cases it is customary practice to convert the mud to the calcium form by treatment with lime and to regulate its viscosity by treatment with a lignosulfonate or quebracho along with caustic soda. In this form the mud is less sensitive to contamination when salt water or a calcareous material is encountered. However, considerable amounts of the chemical treating agents are generally required to convert the mud in this manner and to maintain it in proper condition. During subsequent drilling additional quantities of clay solids become dispersed in the drilling fluid, and this generally necessitates the addition of further quantities of lime, caustic soda and dispersing agent to prevent excessive thickening. Furthermore, mud compositions of this type have a tendency, under high temperature conditions as encountered in deep wells, to undergo gelation. This is believed to be due to a reaction which occurs between the excess lime in the mixture and the clay particles, other than the normal base exchange reaction that takes place at lower temperatures. In any event, the limed mud when subjected to temperatures above 200° F., as for example 250–350° F., will tend to thicken considerably. In some instances where the drilling operation has been stopped and the mud has been allowed to stand quiescent in the borehole for a time, it has been found that this type of drilling mud will thicken to such extent that it is no longer pumpable and may even become solidified.

The present invention provides a novel type of drilling mud which has low sensitivity to contaminants encountered during drilling and which is not subject to thickening because of high temperature well conditions. Drilling mud compositions prepared according to the invention comprise an aqueous dispersion of a hydratable clay and a lyophobic sol of positively charged colloidal particles. The hydratable clay can be either an alkali metal clay or an alkaline earth metal clay, and it is employed in the drilling fluid in an amount substantially less than that normally used in conventional drilling muds. The sol component can be any lyophobic sol in which the colloidal particles carry positive charges. The proportion of these two components to each other is regulated, as hereinafter described, to a value such that the combination will impart to the drilling fluid the desired viscosity and gelation characteristics.

In practicing the invention it is essential that the lyophobic sol employed be of the type in which the colloidal particles are positively charged. Most sols have negatively charged particles, colloidal clays being a common example of this type. There are numerous sols, however, in which the particles carry a positive charge, and methods of preparing such sols are well known; see, for example, "Encyclopedia of Chemical Technology," vol. 4, pages 225r227. Sols are prepared by two general methods referred to as the "condensation" method and the "dispersion" method. In the former the starting materials are in a state of molecular, atomic or ionic subdivision and are caused to react to form particles of colloidal size. One example of this is the preparation of a ferric oxide sol by boiling an aqueous solution of ferric acetate. A common "condensation" procedure involves the double decomposition of water soluble compounds to produce an insoluble material comprising colloidal particles. In the "dispersion" method the starting material is initially in massive state and is disintegrated to colloidal size by suitable physical means such as by mechanical grinding or ultra-sonic dispersion. The well known electric arc procedure (Bredig's method), which may be considered as involving both dispersion and condensation, likewise can be used for the present purpose with some materials.

Examples of aqueous sols which can be prepared so as to have positively charged particles are as follows: The oxides and hydroxides of iron, aluminum, chromium, titanium, zinc, cobalt, and cadmium; carbonates of barium and strontium; chromic chloride; and sols of oxidized iron, copper, bismuth or lead prepared by the Bredig method. All of the foregoing sols can be used to practice the present invention if they are suitably prepared so that the sol particles are in a positively charged form.

The preparation of a drilling fluid according to the invention and the adjustment of its properties can best be understood by considering a clay-sol-water system with respect to viscosity changes as affected by composition. If a thin aqueous dispersion of clay is admixed with varying amounts of a sol of the type herein concerned, an initial rise in viscosity occurs at high clay:sol ratios but the viscosity drops back sharply as the proportion of clay to sol decreases. This appears to be due to the orientation of the negatively charged clay particles about the sol particles which induces a gelation effect in the mixture, followed by a coagulation effect which produces agglomerates and results in a viscosity reduction as the proportion of sol particles increases. As the clay:sol ratio in the mixture is further decreased, the viscosity rises again and passes through a second maximum which is considerably higher than the first. Thereafter, the viscosity again decreases, until at low clay:sol ratios the mixture becomes about as thin as the original clay dispersion. This second maximum is due to orientation of the positively charged sol particles about the clay particles which induces gelation. The decrease in viscosity that occurs as the ratio of clay to sol is thereafter further decreased results from a second stage of coagulation of the particles.

Practice of the present invention depends upon operating in the region around the above-described second viscosity maximum, or in other words in the region where orientation of the sol particles about the clay particles takes place and causes a substantial increase in viscosity. This region generally occurs where the weight ratio of clay to sol particles is within the range of 1:2 to 2:1, although it is subject to variation dependent upon such factors as the particular clay used, the concentration of clay in the mixture, the particular sol employed, the types and amounts of ions in the aqueous phase, etc. By operating in this region, a composition can be prepared which will have sufficient viscosity and gelation characteristics for well drilling purposes and yet will contain an unusually low amount of clay. Useful amounts for practicing the invention generally are within the range of 0.3–5% by weight of the drilling fluid, whereas conventional drilling muds almost invariably contain in excess of 5% clay. The use of such low clay contents is advantageous not only due to the reduced amount of bentonite or other clay that need be supplied but also due to a low sensitivity toward contamination derived from having a low clay content. Furthermore, since in the region of the second viscosity maximum the sol particles are oriented about the clay particles, the latter are afforded protection from contaminating ions. This tends to prevent ion exchange reactions that otherwise would take place with the clay, thus rendering the composition more stable under well conditions. Since no lime is added to the mixture, thickening of the mud at high temperatures, such as occurs with lime base muds, is avoided.

In utilizing the present invention in a well drilling operation, the well could, if desired, be drilled in the earlier stages of operation by employing a conventional mud; and conversion to the present type of drilling fluid could be effected later when more severe operating conditions are encountered. However, this would usually entail the discarding of a large volume of mud and dilution of the rest with water, in order that the clay solid content would be at the desired low level after conversion. It is therefore preferred to initiate the drilling operation by utilizing a mud composition prepared according to the present invention.

A preferred manner of practicing the invention is as follows:

An aqueous sol is admixed with a clay, such as bentonite, in proportions yielding a composition in the region of the previously described viscosity maximum. Sufficient water is added to adjust the viscosity to a suitable level, for instance, to a Stormer viscosity of 15–40 centipoises. For example, a typical composition employing a ferric oxide sol may comprise an aqueous dispersion containing by weight 0.5% ferric oxide and 0.45% clay, the remainder being water. The drilling operation is initiated utilizing such a mixture which has a much lower total solids content than ordinary drilling mud. As the drilling operation proceeds, clays may be encountered which become colloidally dispersed in the drilling fluid. The increase in total solids content of the mud has a tendency to cause the mixture to rise in viscosity, but there is an offsetting tendency resulting from the increase in ratio of clay to sol particle. This change tends to move the composition away from the region of the viscosity maximum, thus reducing the viscosity and gelation values. These effects counterbalance each other to an extent so that any viscosity changes occur relatively slowly. Whenever a substantial change does occur, however, suitable adjustment of the viscosity can readily be effected. If the mixture becomes too fluid due to the increased clay to sol particle ratio, additional quantities of the sol are added to lower this ratio and move the composition back toward the maximum viscosity region. On the other hand, if the mixture gets too thick due to the build-up of total solids therein during the course of drilling, the viscosity can be reduced to the desired level merely by thinning with water.

A drilling operation done in accordance with the invention can thus be continued to the desired depth while keeping the viscosity and gelation characteristics of the mud regulated in the foregoing manner. From time to time, weighting materials such as barytes may be added to secure the desired mud weight. The use of conventional weighting materials, however, can be minimized by preparing the drilling fluid with a sol in which the positively charged particles consist of a material of high density, such as barium sulfate, lead or lead oxide. Also, a suitable organic colloid, such as starch, natural gums, carboxymethylcellulose or the like, may be added whenever it is desired to aid in reducing the water loss of the composition.

I claim:

1. An aqueous drilling fluid comprising a hydratable clay of the group consisting of alkali metal and alkaline earth metal clays in amount of 0.3–5% by weight of the drilling fluid and a water-insoluble inorganic material in the form of a lyophobic sol of positively charged colloidal particles in amount sufficient to orient about the clay particles and thereby substantially increase viscosity.

2. A drilling fluid according to claim 1 in which the weight ratio of clay to the positively charged sol particles is within the range of 1:2 to 2:1.

3. Method of drilling a well by the rotary method which comprises circulating through the borehole during drilling an aqueous drilling fluid comprising a hydratable clay in amount of 0.3–5% by weight of the drilling fluid and a water-insoluble inorganic material in the form of a lyophobic sol of positively charged colloidal particles in amount sufficient to orient about the clay particles and thereby substantially increase viscosity.

4. Method according to claim 3 wherein the weight ratio of clay to the positively charged sol particles is within the range of 1:2 to 2:1.

5. In the drilling of a well by the rotary method, the steps which comprise initiating the drilling utilizing an aqueous drilling fluid comprising a water-insoluble inorganic material in the form of a lyophobic sol of positively charged colloidal particles admixed with a hydratable clay in sufficient amount to substantially increase viscosity due to the orientation of the positively charged sol particles about the clay particles and thereafter regulating viscosity of the drilling fluid by adding water whenever the drilling fluid thickens excessively due to rise in total content of solids and by adding additional amounts of such lyophobic sol whenever the viscosity of the drilling fluid becomes undesirably low due to insufficient orientation of positively charged sol particles about the clay particles.

References Cited in the file of this patent

UNITED STATES PATENTS

| | | |
|---|---|---|
| 1,991,637 | Harth | Feb. 19, 1935 |
| 2,354,648 | Bond | Aug. 1, 1944 |
| 2,692,856 | Litman | Oct. 26, 1954 |

OTHER REFERENCES

Weiser: Colloid Chemistry, second edition, pub. 1949 by John Wiley & Sons, Inc., N. Y., pp. 268 and 269.

Encyclopedia of Chemical Technology, vol. 4, pp. 231 and 236.